Patented June 20, 1950

2,512,341

UNITED STATES PATENT OFFICE 2,512,341

PROCESS FOR HEATING TITANIUM TETRACHLORIDE

Ignace Joseph Krchma, Wilmington, Del., assignor to E. I. du Pont de Nemours & Company, Wilmington, Del., a corporation of Delaware No Drawing. Application April 24, 1947,
Serial No. 743,725

5 Claims. (Cl. 23—202)

This invention relates to novel methods for heating titanium tetrachloride, and more particularly to the heating of titanium tetrachloride in the vaporous state to promote its subsequent reaction with a gaseous oxidizing agent to obtain pigmentary titanium oxide therefrom.

In the vapor phase oxidation of titanium tetrachloride, separate preheating of the reactants prior to their introduction into a reaction zone is very desirable. Since titanium tetrachloride is highly corrosive to metals, especially at elevated temperatures, resort must be had to heating equipment constructed chiefly of refractory materials, through the walls of which the necessary $TiCl_4$ heat is supplied. Most refractory materials, however, are attacked by hot titanium chloride vapors to some extent and hence are unsuitable for use, either because of actual destruction of the refractory itself, or because of leaching out by the $TiCl_4$ of impurities therein, which impurities then contaminate the products. Fused silica, though useful and satisfactory from the standpoint of corrosion resistance, is highly expensive and very fragile. Moreover, these refactory heat exchangers are relatively inefficient, because of their inherent insulating properties and the difficulty of fabricating the complex and delicate shapes which commercial usage requires.

I have found that the foregoing and other disadvantages attendant prior methods for heating titanium tetrachloride for vapor phase oxidation can be effectively remedied. Accordingly, it is among the objects of this invention to provide novel methods for accomplishing that result. It is among the particular objects of this invention to provide a novel method for effecting the heating of titanium tetrachloride without recourse to heat transfer through refractory or other non-corrosive materials. A further object is to provide a novel method of preheating titanium chloride vapors which only requires apparatus of simple design which can be readily and easily constructed from refractory materials.

These and other objects can be attained in this invention which broadly comprises heating titanium tetrachloride, especially while in the vapor state, by commingling with said chloride the hot combustion products obtained from the interaction of a carbonaceous substance such as carbon or carbon monoxide with an oxygen-containing gas.

In a more specific and preferred embodiment, the invention comprises mixing preheated, vaporized titanium tetrachloride, at a temperature above 137° C., with sufficient of the combustion products resulting from the burning of relatively pure carbon monoxide with hot oxygen as will raise the temperature of said chloride vapor to that desired for the subsequent oxidation reaction.

A simple thermodynamic calculation, in accordance with the invention, will illustrate its efficacy: that is, if one gram mole of carbon monoxide, at 18° C., is burned in an insulated chamber with one-half gram mole of oxygen, previously heated to 900° C., sufficient heat will be evolved, assuming constant pressure, that the gram mole of carbon dioxide produced by the combustion will be heated to 900° C., with 61,600 gram calories left over. Theoretically, such quantity of heat will be sufficient to raise the temperature of 3.6 gram moles of titanium tetrachloride vapor from 200° C. to 900° C., and will provide a gas mixture at said 900° C. temperature consisting of 78.3% titanium tetrachloride and 21.7% carbon dioxide.

In practically applying the invention, sufficient carbon monoxide (or a relatively pure form of solid, finely-divided, powdered carbon, carbon black, petroleum coke, etc.) is mixed and burned with an oxidizing gas, such as air, oxygen, or similar gas capable of supporting combustion, to provide an amount of carbon dioxide, at a sufficiently high temperature that when it is fed into or otherwise mixed with liquid or vaporous titanium tetrachloride, the temperature of said chloride is raised to the point desired to effect its subsequent oxidation, e. g., from about 300° C. to 1200° C., and preferably to from 600–1000° C. The temperature of the inert carbon dioxide thus generated and used ranges from, say, 1000° C. to 1200° C. and preferably does not exceed 1600° C. The carbon dioxide combustion product may be introduced into the titanium tetrachloride during the latter's passage to an oxidizing zone, or, if desired, can be admixed therewith in a suitable heating vessel constructed of or lined with a material such as silica, porcelain, or other refractory resistant to the corrosive action of the chloride. After desired commingling and heating of the titanium tetrachloride has been effected, the resulting mixture is introduced into a suitable reaction zone in which oxidation of the titanium tetrachloride can take place and from which pigmentary titanium dioxide can be recovered as a desired end product.

To a clearer understanding of the invention, the following specific example is given, which is merely illustrative in nature and not to be construed as in any wise limiting the underlying principles of my invention:

Example

Liquid TiCl₄ was quickly volatilized and superheated to a temperature of 250° C. in a conventional, electrically-heated tube or coil preheater constructed of silica. The TiCl₄ vapors thus obtained were then conducted to a mixing chamber, also constructed of silica.

While this was in progress, carbon monoxide was burned with a mixture of dry oxygen and nitrogen in a separate ceramic mixing chamber. The oxygen and nitrogen were first added to this chamber at the rates of 0.053 and 0.254 cu. ft. per minute, respectively, and mixed therein. The carbon monoxide was then introduced at the rate of 0.168 cu. ft. per minute. Combustion of the whole was initiated by a spark. The hot $CO_2$ product gases were immediately conducted to the silica mixing chamber into which the TiCl₄ vapors were also being introduced, the latter at the rate of 62.5 cc. per minute. The TiCl₄ thus was rapidly superheated to a temperature of 950° C. The resulting hot mixture of TiCl₄ and $CO_2$ was at once passed to a conventional oxidation chamber, where it was reacted with air, preheated to 975° C. and entering the oxidizer at the rate of 2.54 cu. ft. per minute. The oxidation reaction proceeded completely, and excellent $TiO_2$ pigment was produced.

In order to preheat a comparable quantity of TiCl₄ to 950° C. by conventional means, the chloride vapors were held in the electrically-heated silica coil preheater previously used simply to vaporize the chloride, until they reached the desired temperature. The power consumption of such a heater, its fragility and complexity, and the greater time it required made this method relatively much more costly and much less desirable.

In actual practice, some of the heat produced by the combustion of the carbon monoxide will be lost through the walls of the enclosing vessel or reactor. Good insulation will minimize or prevent such loss, particularly when the operation is being carried out on a large scale, so that the ratio of heat transfer surface to volume is relatively small. In some applications, it will be desirable to surround the carbon monoxide combustion chamber with a jacket containing one of the materials to be heated, so that heat lost from one operation is transferred to and saved in another.

The thermodynamic calculations given above were based on the use of exact equivalents of carbon monoxide and oxygen. Actually, it will generally be desirable to use a slight excess of carbon monoxide to ensure complete consumption of the oxygen, so that none of the latter can mix and react with the titanium tetrachloride to produce undesired $TiO_2$ prematurely. Alternatively, some chlorine may be added with the TiCl₄, to re-chlorinate any $TiO_2$ which might be formed by reaction with such free oxygen. The use of efficient mixing devices, and a fairly large combustion space, will aid in effecting complete combustion; so that a smaller excess of carbon monoxide will be required, and any possible need of supplying additional chlorine will be avoided.

Because of the danger of choking or plugging the apparatus with solid titanium-containing reaction products, it is necessary to use relatively pure carbon or carbon monoxide as well as oxidizing gases that are dry and free from hydrogen. The usual commercial carbon monoxide which, for example, contains 2% to 3% or appreciable amounts of hydrogen, is not satisfactory for use. To obtain optimum results hereunder, gases containing less than about 0.2% hydrogen are employed.

Many variations of this invention are possible. The hot combustion products may be mixed directly with liquid titanium tetrachloride, if desired, but this practice is not preferred because excessive amounts of carbon monoxide are required. Preferably, the titanium tetrachloride prior to treatment herein is heated by other means to a preheat temperature at least above its boiling point or even higher, before mixing is effected with the hot combustion products. Either or both substances (carbon monoxide and oxidizing gas) which are to be reacted to produce heat may be preheated, or not, according to the conditions required.

A primary advantage of this invention is that the equipment required for its practice is simple, comparatively small, and inexpensive. Heating of the corrosive chloride may be accomplished in a single chamber or vessel. No heat transfer through refractory walls is required. In fact, the refractory material of construction must act as an insulator, a function for which most refractories are well adapted. Furthermore, little surface is exposed to the hot corrosive titanium tetrachloride, so that corrosion and leaching out of impurities are minimized. Thus, a wider assortment of materials of construction will be suitable for the heater according to this invention, than for any of the prior heat exchangers.

The many advantages and uses of this invention will be obvious. Not only does this invention permit the heating of titanium tetrachloride to extremely high temperatures, but it also introduces considerable savings in the cost of heating, even to moderate temperatures.

I claim as my invention:

1. A process for heating titanium tetrachloride to a temperature sufficient to induce oxidation thereof in the vapor phase upon subsequent contact with a hot, gaseous oxidizing agent, which comprises directly commingling said chloride with the hot combustion products at temperatures ranging from about 1000° C. to not to exceed 1600° C. resulting from the interaction of a dry oxidizing gas with a carbonaceous substance from the group consisting of solid carbon and carbon monoxide, said oxidizing gas and carbonaceous substance containing less than 0.2% of hydrogen.

2. A process for heating titanium tetrachloride to a temperature ranging from about 300° C. to 1200° C. which comprises directly commingling with said chloride the hot combustion products at temperatures ranging from about 1000° C. to not to exceed 1600° C. from the reaction of hydrogen-free carbon monoxide with a dry, oxygen-containing gas.

3. A process for heating titanium tetrachloride to a temperature ranging from about 300° C. to 1200° C. which comprises directly commingling with said chloride the hot combustion products at temperatures ranging from about 1000° C. to not to exceed 1600° C. from the reaction of hydrogen-free carbon monoxide with dry air.

4. A process for heating vaporous titanium tetrachloride to a temperature ranging from 600–1000° C. which comprises directly mixing said chloride with hydrogen-free carbon dioxide at temperatures ranging from about 1000° C.–1200°

C. obtained from the combustion of carbon monoxide with a dry oxygen-containing gas.

5. A process for heating titanium chloride vapor to a temperature ranging from 600–1000° C., comprising directly mixing with titanium tetrachloride having a temperature of about 200° C., the hot, substantially hydrogen-free, dry combustion gases at temperatures ranging from about 1000° C.–1200° C. resulting from the reaction of hydrogen-free carbon monoxide and dry air.

IGNACE JOSEPH KRCHMA.

REFERENCES CITED

The following references are of record in the file of this patent:

UNITED STATES PATENTS

| Number | Name | Date |
|---|---|---|
| 1,821,333 | Tolman | Sept. 1, 1931 |
| 1,874,801 | Porter | Aug. 30, 1932 |
| 2,184,884 | Muskat et al. | Dec. 26, 1939 |
| 2,340,610 | Muskat | Apr. 29, 1941 |
| 2,367,118 | Hginen | Jan. 9, 1945 |
| 2,394,633 | Pechukas et al. | Feb. 12, 1946 |